(12) United States Patent
Lee et al.

(10) Patent No.: US 6,369,169 B1
(45) Date of Patent: Apr. 9, 2002

(54) MODIFIED POLYSTYRENE SPHERICAL, RESIN AND PROCESS FOR DECONTAMINATING WASTE WATER BY USING THE SAME

(75) Inventors: Yoon Sik Lee, Kyunggi-do; Sun Jong Ryoo, Seoul, both of (KR)

(73) Assignee: Beadtech Inc., Seoul (KR)

( * ) Notice: Subject to any disclaimer, the term of this patent is extended or adjusted under 35 U.S.C. 154(b) by 0 days.

(21) Appl. No.: 09/582,839

(22) PCT Filed: Nov. 5, 1999

(86) PCT No.: PCT/KR99/00664

§ 371 Date: Sep. 7, 2000

§ 102(e) Date: Sep. 7, 2000

(87) PCT Pub. No.: WO00/27896

PCT Pub. Date: May 18, 2000

(30) Foreign Application Priority Data

Nov. 5, 1998 (KR) .............................................. 98-47748
Oct. 30, 1999 (KR) .............................................. 99-47825

(51) Int. Cl.[7] .................................................. C08F 8/00
(52) U.S. Cl. .................... 525/384; 525/385; 525/333.3; 525/332.2; 525/241; 525/61
(58) Field of Search ................................. 525/384, 385, 525/333.3, 332.2, 241, 61

(56) References Cited

U.S. PATENT DOCUMENTS 4,908,405 A * 3/1990 Bayer et al. .............. 525/332.2
5,466,758 A * 11/1995 Yoon-Sik et al. ........ 525/332.2

FOREIGN PATENT DOCUMENTS

| EP | 0822271 A2 | 2/1998 |
| GB | 2280430 A | 2/1995 |
| JP | 51144060 | 10/1976 |
| JP | 10137780 A | 5/1998 |
| JP | 10151471 A | 6/1998 |
| JP | 10165757 A | 6/1998 |

* cited by examiner

Primary Examiner—James J. Seidleck
Assistant Examiner—Olga Asinovsky
(74) Attorney, Agent, or Firm—Birch, Stewart, Kolasch & Birch

(57) ABSTRACT

An adsorbent, polystyrene spherical resin grafted with polyethylene glycol characterized in that polystyrene resin is crosslinked with 1 to 10 wt % of divinylbenzene, the content of polyethylene glycol is more than 50 wt % and the molecular weight of polyethylene glycol part, is more than 500 Da, is described. In addition processes for decontaminating dye contained in waste water of dye industry, heavy metal ion contained in waste water, surfactant, humic substance contained in trash sediment effectively and quickly by using the said adsorbent, are disclosed.

11 Claims, No Drawings

MODIFIED POLYSTYRENE SPHERICAL, RESIN AND PROCESS FOR DECONTAMINATING WASTE WATER BY USING THE SAME

This application is the national phase under 35 U.S.C. §371 of PCT International Application No. PCT/KR99/00664 which has an International filing date of Nov. 5, 1999, which designated the United States of America.

TECHNICAL FIELD

The present invention relates to a modified polystyrene spherical resin and a process for decontaminating waste water by using the modified polystyrene spherical resin. More particularly, the present invention directed to a process for decontaminating process by using polystyrene spherical resin grafted with polyethylene glycol as a adsorbent, and a process for elutriate an adsorbent from the adsorbent adsorbing contaminant through a simple process to resuscitate the adsorbent.

BACKGROUND ART

Industrial waste water is a malignant water pollutants. For example, waste water of dye industry, heavy metal ion contained in waste water, surfactant, humic substance contained in trash sediment cause serious environmental problems. Up to now, several methods for treating such malignant pollutants have been suggested, that is, chemical, physical and biological treating process are known to a public.

Among such methods, chemical treatment processes employ chemical unit processes, for example, oxidation process which decomposes chromophore of dye by using oxidation agent and thereby decolourizes waste water. Hydrogen peroxide, etc., are used in this oxidation process [Yamasaki, K.; Sakata, K.; Yokotani, A; Japanese Patent Appln. No. 10-080,693(1998): Hirotsuji, J.; Kaai, Y.; Ikeda, A.; Japanese Patent Appln. No. 08-267,077(1996): Taoda, H. Japanese Patent Appln. No.05-253,581(1993): Saito, S.; Murayama, K.; Misawa, K. Japanese Patent Appln. No. 03-188,992(1991): Mizutani, K.; Inoue, H. JP 51,144,060 (1976)]. Recently, $O_3$, etc., are reported as a new oxidation agent. [Kataoka, K. Japanese Patent Laid-Open Publication No.10-137,780(1998): Ueno, S. Japanese Patent Laid-Open Publication No. 10-151,471(1998): watanabe, M.; Hayashi, F.; Dazai, K. Japanese Patent Laid-Open Publication No. 10-165,757(1998): Hayashi, F.; Watanabe, M.; Nishino, Y.; Dazai, H. Japanese Patent Appln. No.10-118, 144(1998): fischer, W. G. European Patent Publication No. 822, 271 (1998)].

The oxidation process decolourizes waste water, however, may creates toxic by-products which remains in waste water, and thereby cannot lower the COD value. In addition, when $O_3$ or electron beam is used as an oxidant, energy consumption is enormous.

The biological process, in general, employs microorganism in aeration tank. However, this method requires spacious plant site, long process time, intricate conditions and operation for activation of microorganism.

Meanwhile, the physical process employs active carbon adsorption method. [Nikolaevsky, R.; Monosov, M.; Monosov, E.; Sharony, E.; Gurevich, D. U.S. Pat. No. 5,792,336(1998): Maesaki, M.; Nakajima, M.; Hasegawa, H. Japanese Patent Appln. No.09-253,669(1997): Matsumoto, Y.; Sugano, N.; Inui, T.; Akao, K. Japanese Patent Appln. No.09-248,562: Hatano, Y.;. Shirama, S.; Ishikawa, T.; Yobiko, Y.; Takaoka, S. Japanese Patent Appln. No. 08-281,271(1996): Sugiura, W.; Tanaka, S.; Shimotomai, K. Japanese Patent Appln. No. 08-000,261 (1996): Tamatoshi,K.; Morishima, K. Japanese Patent Appln. No. 07-047359(1995): McCollam, F. M. J. British Patent Appln. No.2,280,430(1995): Michna, M. ; Puppe, L. German Patent Appln. No. 4,213,163(1993)]

However, these physical processes have also some demerits. That is, active carbon which has been used in adsorption process, cannot be regenerated, and therefore, should be destructed by incineration. The incineration process employs bunker-C oil, which leads to energy consumption and air contamination.

Therefore, in order to overcome the above described drawbacks of the prior arts, the inventors of the present invention have conducted an extensive research for many years for developing polystyrene adsorbent which can be used repeatedly in waste water treatment process.

Finally, the present inventors have prepared a novel polystyrene adsorbent and a novel waste water treatment process which, can substitute entirely traditional active carbon process and which can save utility expense for waste water treatment remarkably.

The preparation methods of the adsorbent of the present invention are described in detail in present inventor's U.S. Pat. No. 5,466,758(1995), Korean Patent No. 119,262 (1997), Korean Patent No. 119,263(1997) and Korean Patent Appln. No. 98-47748.

DISCLOSURE OF THE INVENTION

It is therefore objects of the present invention to provide a novel adsorbent resin which can be used in novel processes which can substitute entirely traditional granular active carbon adsorption method for waste water treatment.

The capacity of adsorption of the polystyrene resin grafted with polyethylene glycol of the present invention can be controlled by adjusting the content and molecular weight of polyethylene glycol. Also, the adsorption efficiency of the adsorbent of the present invention are varied depends on grafting method.

The present inventors have widely researched the cross linking ratio and size of the polystyrene spherical resin which can be used repeatedly in adsorption/desorption/regeneration processes without loss of physical and mechanical properties thereof.

As a result, the present inventor discovered that the polystyrene spherical resin which is crosslinked with 1 to 10 wt %, preferably 2 to 8 wt %, more preferably 4 to 6 wt % of divinylbenzene, is appropriate to be used as a substrate for making the adsorbent for waste water which contains dye, heavy metal ion, surfactant, humic substance and etc.

Also, the present inventors have found that the polystyrene spherical resin of which size is 100 to 500 mesh, preferably 200 to 400 mesh, is desirable to be used as a substrate for making the adsorbent for waste water which contains dye, heavy metal ion, surfactant humic substance and etc.

In addition, the present inventor have further researched several methods for introducing β hydroxy group on the surface of polystyrene spherical resin without using propylene oxide or ethylene oxide(as to the method for introducing β hydroxy group on the surface of polystyrene spherical resin by using propylene oxide or ethylene oxide, please refer the present inventor's U.S. Pat. No. 5,466,758).

Through the above research project, the present inventor have found out that β hydroxy group can also be introduced on the surface of polystyrene spherical resin by reacting polystyrene directly with 2-methyltetrahydrofuran, or by hydrolysis chloromethylpolystyrene with metal hydroxide, or by aminolysis chloromethylpolystyrene with ethanol amine or diethanol amine. Polystyrene spherical resin of the present invention, which is having a hydroxy group, may also be used as a intermediate material for making the polystyrene spherical resin grafted with polystyrene glycol.

Further, the present inventor have studied the proper content and proper molecular weight of polyethylene glycol of the polystyrene-g-polyethylene glycol adsorbent which has proper adsorption capacity and efficiency to be used as an adsorbent for waste water which contains dye, heavy metal ion, surfactant and etc.

As a result, the present inventor have found that the appropriate content of polyethylene glycol of the polystyrene-g-polyethylene glycol spherical resin to be used as a adsorbent, is more than 50 wt %, preferably 60 to 95 wt % in case that the polystyrene core is crosslinked with 1 wt % of divinylbenzen, and is 70 to 90 wt % in case that the polystyrene core is cross linked with 2 to 3 wt % of divinylbenzene.

Moreover, the present inventor have found that, for the purpose of using the polystyrene-g-polyethylene glycol spherical resin as the adsorbent which has best adsorption capacity and efficiency against dye, heavy metal ion, surfactant, humic substance contained in waste water or trash sediment water, it is desirable that the molecular weight of polyethylene glycol part of the polystyrene-g-polyethylene glycol is more than 500 Da, preferably more than 900 Da, most preferably 900 to 3,000 Da.

Therefore, it is an object of the present invention to provide a polystyrene spherical resin grafted with polyethylene glycol characterized in that polystyrene resin is crosslinked with 1 to 10 wt % of divinylbenzene, the content of polyethylene glycol is more than 50 wt % and the molecular weight of polyethylene glycol part, is more than 500 Da.

Another object of the present invention is to provide a process for decontamination of dye, surfactant, heavy metal ion, humic substance contained in waste water or trash sediment water by using the polystyrene spherical resin grafted with polyethylene glycol.

Still another object of the present invention is to provide a process for recovering dye by using organic solvent from a polystyrene spherical resin grafted with polyethylene glycol, whereon dye is adsorbed.

Still further object of the present invention is to provide a process for recovering a polystyrene spherical resin adsorbent grafted with polyethylene glycol through a elutriate process by using organic solvent.

BEST MODE FOR CARRYING OUT THE INVENTION

The present invention will be more specifically illustrated by the following examples but it should be understood that the present invention is not limited to these examples in any manner.

EXAMPLE 1

Spherical polystyrene resin (200–400 mesh) crosslinked with 2 wt % of divinylbenzene, was reacted with propylene oxide in the presence of Lewis acid catalysts. The resulting resin was reacted with ethylene oxide in high pressure reactor to prepare polystyrene grafted with polyethylene glycol spherical resin. About 200 Mg of the spherical resin thus obtained, of which polyethylene glycol content is 68 to 87 wt %, was used for dye adsorption test.

The spherical resin thus prepared and 10 ml of Yellow 5GL dye (manufactured by NOVARTIS in Switzerland) $10^{-4}$ M solution were added into a reactor. After 1 hour, light absorbency of the dye solution was measured.

EXAMPLE 2

Spherical polystyrene resin (200–400 mesh) crosslinked with 1 wt % of divinylbenzene, was reacted with propylene oxide in the presence of Lewis acid catalysts. The resulting resin was reacted with ethylene oxide in high pressure reactor to prepare polystyrene grafted with polyethylene glycol spherical resin. 200 Mg of the spherical resin thus obtained, of which polyethylene glycol content is 60 to 94 wt %, was used for dye adsorption test by the method described in Example 1.

EXAMPLE 3

Hydroxy radical was introduced on the surface of spherical polystyrene resin (200–400 mesh) crosslinked with 1 wt % of divinylbenzene, by using ozone ($O_3$). The polystyrene spherical resin on which hydroxy radical introduced, was reacted with vinylmonomer which contains polyethylene glycol, to prepare polystyrene spherical resin grafted with polyethylene glycol. 200 Mg of spherical resin thus obtained, was used for dye adsorption test by the method described in Example 1.

EXAMPLE 4

200 Mg of polystyrene adsorbent resin grafted with polyethylene glycol (200–400 mesh, polyethylene glycol content: 82 wt %, average molecular weight of polyethylene glycol: 2,400 Da) was added into a reactor and 10 ml of Blue 4GL dye(manufactured by NOVARTIS is Switzerland) $10^{-4}$ M solution was added thereto. After 1 hour, the light absorbency of the dye solution was measured. The result are described in Table 1.

Comparative Example 1

200 Mg of zeolite adsorbent for water treatment manufactured by Wangpyo Chemical in Korea, was added into a reactor and 10 ml of Blue 4GL dye $10^{-4}$ M solution was added thereto. After 1 hour, the light absorbency of the dye solution was measured by the method described in Example 1.

Comparative Example 2

200 Mg of Celite adsorbent manufactured by Shinyo Pure Chemical, was added into a reactor and 10 ml of Blue 4GL dye $10^{-4}$ M solution was added thereto. After 1 hour, the light absorbency of the dye solution was measured.

Comparative Example 3

200 Mg of granular active carbon adsorbent manufactured by Duksan Chemical in Korea was added into a reactor and 10 ml of Blue 4GL dye $10^{-4}$ M solution was added thereto. After 1 hour, the light absorbency of the dye solution was measured.

EXAMPLE 5

Spherical polystyrene resin (100–200 mesh) crosslinked with 5 wt % of divinylbenzene, was reacted with propylene oxide in the presence of Lewis acid catalysts. The resulting resin was reacted with ethylene oxide in high pressure reactor to prepare polystyrene grafted with polyethylene glycol spherical resin. 200 Mg of the spherical resin thus obtained, of which polyethylene glycol content is 65 to 90%, was used for dye adsorption test by the method described in Example 1.

EXAMPLE 6

Spherical polystyrene resin (100–200 mesh) crosslinked with 8 wt % of divinylbenzene, was reacted with propylene oxide in the presence of Lewis acid catalysts. The resulting resin was reacted with ethylene oxide in high pressure reactor to prepare polystyrene grafted with polyethylene glycol spherical resin. 200 Mg of the spherical resin thus obtained, of which polyethylene glycol content is 60 to 92%, were added into a reactor and 10 ml of Yellow 5GL dye $10^{-4}$ M solution was added into a reactor. After 1 hour, the light absorbency of the dye solution was measured. The result are described in Table 1.

EXAMPLE 7

Spherical polystyrene resin (80–150 mesh) crosslinked with 10 wt % of divinylbenzene, was reacted with propylene oxide in the presence of Lewis acid catalysts. The resulting resin was reacted with ethylene oxide in high pressure reactor to prepare polystyrene grafted with polyethylene glycol spherical resin. 200 Mg of the spherical resin thus obtained, of which polyethylene glycol content is 55 to 90 wt %, was used for dye adsorption test by the method described in Example 1. The result are described in Table 1.

Comparative Example 4

200 Mg of polystyrene adsorbent resin grafted with polyethylene glycol (200–400 mesh, polyethylene glycol content: 45 wt %, average molecular weight of polyethylene glycol: 400 Da) was added into a reactor and 10 ml of Blue 4GL dye $10^{-4}$ M solution was added thereto. After 1 hour, the light absorbency of the dye solution was measured. The result was that 50% of dye was removed from the solution.

TABLE 1

| Spherical | Decontamination ratio of dye (%) | |
| --- | --- | --- |
| resin | After 1 hr. | After 2 hrs. |
| Example 1 | 88 | 99 |
| Example 2 | 77 | 98 |
| Example 3 | 0 | 0 |
| Example 4 | 99 | 99.7 |
| Example 5 | 80 | 95 |
| Example 6 | 83 | 95 |
| Example 7 | 78 | 96 |
| Comparative example 1 | 1.5 | 1.6 |
| Comparative example 2 | 15.5 | 17.0 |
| Comparative example 3 | 65 | 67.9 |
| Comparative example 4 | 36 | 40 |

As seen in the above Table 1, the adsorbent resins prepared in Examples 1, 2, 4–6 and 7 represent distinguished dye adsorption efficiencies in comparison with those of active carbon adsorbents. Moreover, the time required for decontamination of dye, of the present adsorbent resins were remarkably shortened than those of the adsorbents of Comparative Examples.

EXAMPLE 8

Polystyrene spherical resin adsorbing Blue 4GL of Example 2, was added into a reactor and 10 ml of N,N-dimethylformamide was added thereto. After 1 hour, the light absorbency of the solution thus obtained was measured. The result was that 70% of adsorbed dye was desorbed and eluted into the eluent, i.e., N,N-dimethylformamide by the first washing, and that 80% of adsorbed dye was desorbed by the second washing and thereby, the adsorbent resin was decolourized.

EXAMPLE 9

Polystyrene spherical resin adsorbing Blue 4GL dye of Example 2, was added into a reactor and 10 ml N,N-dimethylacetamide was added thereto. After 1 hour, the light absorbency of the solution thus obtained was measured. The result was that 69% of adsorbed dye was desorbed and eluted into the eluent, i.e., N,N-dimethylformamide by the first washing, and that 80% of adsorbed dye was desorbed by athe second washing and thereby, the adsorbent resin was decolourized.

EXAMPLE 10

Polystyrene spherical resin adsorbing Blue 4GL dye of Example 2, was added into a reactor and 10 ml N-methyl-2-pyrrolidinone was added thereto. After 1 hour, the light absorbency of the solution thus obtained was measured. The result was that 71% of adsorbed dye was desorbed and eluted into the eluent, i.e., N-methyl-2-pyrrolidinone by the first washing, and that 80% of adsorbed dye was desorbed by the second washing and thereby, the adsorbent resin was decolourized.

Comparative Example 5

The granular active carbon adsorbing Blue 4GL dye of Comparative Example 3 was added into a reactor and 10 ml of dimethylformamide was added thereto. After 1 hour, light absorbency of the solution was measured. The result was that the dye adsorbed was scarcely eluted.

EXAMPLE 11

Adsorption-desorption tests were repeated more than twenty times by using the polystyrene-g-polyethylene glycol resin adsorbing Blue 4GL dye, of Examples 4 to 8. The results were that the differences between the adsorption efficiencies of the fresh adsorbent resin and those of regenerated adsorbent resin were 0 to 10%.

As can be seen in the result of Example 8 to 11 and that of Comparative Example 5, the dye adsorbed on polystyrene-g-polyethylene glycol spherical resin could be desorbed and recoverd by using the methods of the present invention.

EXAMPLE 12

Spherical polystyrene resin (200–400 mesh) crosslinked with 2 wt % of divinylbenzene, was reacted with propylene oxide in the presence of Lewis acid catalysts. The resulting resin was reacted with ethylene oxide in high pressure reactor to prepare polystyrene grafted with polyethylene glycol spherical resin. 200 Mg of the spherical resin thus obtained, of which polyethylene glycol content is 68 to 87 wt %, were added into a reactor and 10 ml of Yellow 5GL dye $10^{-4}$ M solution was added thereto. After 1 hour, the light absorbency of the dye solution was measured. The result was that 89 to 99% of dye was decontaminated from the solution.

EXAMPLE 13

Spherical polystyrene resin (200–400 mesh) crosslinked with 1 wt % of divinylbenzene, was reacted with propylene oxide in the presence of Lewis acid catalysts. The resulting resin was reacted with ethylene oxide in high pressure reactor to prepare polystyrene grafted with polyethylene glycol spherical resin. 200 Mg of the spherical resin thus obtained, of which polyethylene glycol content is 60 to 94 wt %, was added into a reactor and 10 ml of Yellow 5GL dye $10^{-4}$ M solution was added thereto. After 1 hour, the light absorbency of the dye solution was measured. The result was that 78 to 98% of dye was decontaminated from the solution.

EXAMPLE 14

Spherical chloromethylpolystyrene resin (200–400 mesh) crosslinked with 3 wt % of divinylbenzene, was hydrolyzed by metal hydroxide, or aminolyzed by ethanolamine, diethanolamine to introduce hydroxy group thereon. The resulting resin was reacted with ethylene oxide in high pressure reactor to prepare polystyrene grafted with polyethylene glycol spherical resin. 200 Mg of the spherical resin thus obtained, of which polyethylene glycol content is 55 to 92 wt %, were added into a reactor and 10 ml of Yellow 5GL dye $10^{-4}$ M solution was added thereto. After 1 hour, the light absorbency of the dye solution was measured. The result was that 70 to 95% of dye was decontaminated from the solution.

EXAMPLE 15

Spherical polystyrene resin (200–400 mesh) crosslinked with 1 wt % of divinylbenzene, was reacted with 2-methyltetrahydrofuran in the presence of Lewis acid catalysts. The resulting resin was reacted with ethylene oxide in high pressure reactor to prepare polystyrene grafted with polyethylene glycol spherical resin. 200 Mg of the spherical resin thus obtained, of which polyethylene glycol content is 57 to 91 wt %, was added into a reactor and 10 ml of Yellow 5GL dye $10^{-4}$ M solution was added thereto. After 1 hour, the light absorbency of the dye solution was measured. The result was that 72 to 96% of dye was decontaminated from the solution.

EXAMPLE 16

Spherical polystyrene resin (200–400 mesh) crosslinked with 2 wt % of divinylbenzene, was reacted with propylene oxide in the presence of Lewis acid catalysts. The resulting resin was reacted with ethylene oxide in high pressure reactor to prepare polystyrene grafted with polyethylene glycol spherical resin. 200 Mg of the spherical resin thus obtained, of which polyethylene glycol content is 70 to 90 wt %, was added into a reactor and 10 ml of humic acid 250 ppm. solution was added thereto. After 1 hour, chromaticity and COD(Chemical Oxygen Demand) of the dye solution were measured. The result was that 40 to 50% of humic acid was decontaminated from the solution.

EXAMPLE 17

Spherical polystyrene resin (200–400 mesh) crosslinked with 1 wt % of divinylbenzene, was reacted with propylene oxide in the presence of Lewi.s acid catalysts. The resulting resin was reacted with ethylene oxide in high pressure reactor to prepare polystyrene grafted with polyethylene glycol spherical resin. 200 Mg of the spherical resin thus obtained, of which polyethylene glycol content is 60 to 94 wt %, was added into a reactor and 10 ml of humic acid 250 ppm. solution was added into a reactor. After 1 hours chromaticity and COD(Chemical Oxygen Demand) of the dye solution were measured. The result was that 50 to 60% of humic acid was decontaminated from the solution.

EXAMPLE 18

Spherical polystyrene resin (200–400 mesh) crosslinked with 2 wt % of divinylbenzene, was reacted with propylene oxide in the presence of Lewis acid catalysts. The resulting resin was reacted with ethylene oxide in high pressure reactor to prepare polystyrene grafted with polyethylene glycol spherical resin. 200 Mg of the spherical resin thus obtained, of which polyethylene glycol content is 68 to 87 wt %, were added into a reactor and 10 ml of dodecyl benzene sulfonic acid sodium $10^{-4}$ M solution were added thereto. After 1 hour, chromaticity and COD(Chemical Oxygen Demand) of the dye solution were measured. The result was that 55 to 65%. of surfactant was decontaminated from the solution.

EXAMPLE 19

Spherical polystyrene resin (200–400 mesh) crosslinked with 1 wt % of divinylbenzene, was reacted with propylene oxide in the presence of Lewis acid catalysts. The resulting resin was reacted with ethylene oxide in high pressure reactor to prepare polystyrene crafted with polyethylene glycol spherical resin. 200 Mg of the spherical resin thus obtained, of which polyethylene glycol content is 60 to 94 wt %, was added into a reactor and 10 ml of $La(OTf)_3$ 50 ppm. solution was added thereto. After 2 hour, ICP (Inductive Coupled Plasma) of the metal ionic solution was measured. The result was that 50 to 55% of metal ion was decontaminated from the solution.

EXAMPLE 20

By using 10 ml of $Cr_2(SO_4)_3$ 50 ppm. solution, decontamination of metal ion was measured through the method described in Example 8. The result was that 50 to 60% metal ion was decontaminated from the solution.

EXAMPLE 21

Polystyrene graft polyethylene glycol spherical resin adsorbing Yellow 5GL dye of Example 13, was added into a reactor and 10 ml N,N-dimethylformamide was added thereto. After 1 hour, the light absorbency of the solution thus obtained, was measured. The result was that 69% of adsorbed dye was desorbed and eluted the eluent, i.e., N,N-demethylforamamide by the first washing, and that 80% of adsorbed dye was desorbed by the second washing and thereby, the adsorbent resin was decolourized.

EXAMPLE 22

Polystyrene graft polyethylene glycol spherical resin adsorbing Yellow 5GL dye of Example 13, was added into a reactor and 10 ml N,N-dimethylacetamide was added thereto. After 1 hour, the light absorbency of the solution thus obtained, was measured. The result was that 69% of adsorbed dye was desorbed and eluted the eluent, i.e., N,N-demethylacetamide by the first washing, and that 80% of adsorbed dye was desorbed by the second washing and thereby, the adsorbent resin was decolourized.

EXAMPLE 23

Polystyrene graft polyethylene glycol spherical resin adsorbing Yellow 5GL dye of Example 13, was added ito a reactor and 10 ml N-methyl-2-pyrrolidinone was added thereto. After 1 hour, the light absorbency of the solution thus obtained, was measured. The result was that 69% of adsorbed dye was desorbed and eluted the eluent, i.e., N-methyl-2-pyrrolidinone by the first washing, and that 80% of adsorbed dye was desorbed by the second washing and thereby, the adsorbent resin was decolourized.

EXAMPLE 24

Polystyrene graft polyethylene glycol spherical resin adsorbing humic acid of Example 17, was added into a reactor and 10 ml N,N-dimethylformamide was added thereto. After 1 hour, the light absorbency of the solution thus obtained was measured. The result was that 75% of adsorbed humic acid was desorbed and eluted into the eluent.

EXAMPLE 25

Polystyrene graft polyethylene glycol spherical resin adsorbing humic acid of Example 5, was added into a reactor and 10 ml N,N-dimethylacetamide was added thereto. After 1 hour, the light absorbency of the solution thus obtained was measured. The result was that 70% of adsorbed humic acid was desorbed and eluted into the eluent.

EXAMPLE 26

Polystyrene graft polyethylene glycol spherical resin adsorbing humic acid of Example 17, was added into a reactor and 10 ml N-methyl-2-pyrrolidinone was added thereto. After 1 hour, the light absorbency of the solution thus obtained was measured. The result was that 71% of adsorbed humic acid was desorbed and eluted into the eluent.

EXAMPLE 27

Adsorption-desorption tests as described above were repeated more than twenty times by using the polystyrene resin grafted with polyethylene glycol, which is adsorbing Yellow 5GL dye, of Examples 13 and 21. The results were that the differences between the adsorption efficiencies of the fresh adsorbent resin and those of regenerated adsorbent resin were within 0 to 10%.

EXAMPLE 28

Adsorption-desorption tests as described above were repeated more than twenty times by using the polystyrene resin grafted with polyethylene glycol, which is adsorbing humic acid, of Examples 17 and 24. The results were that the differences between the adsorption efficiencies of the fresh adsorbent resin and those of regenerated adsorbent resin were within 0 to 10%.

Comparative Example 6

200 Mg of Zeolite adsorbent for water treatment was added into a reactor and 10 ml of Yellow 5GL dye $10^{-4}$ M solution was added thereto. After 1 hour, the light absorbency of the dye solution was measured. The result was that 1.5% of dye was decontaminated from the solution.

Comparative Example 7

200 Mg of Celite adsorbent was added into a reactor and 10 ml of Yellow 5GL dye $10^{-4}$ M solution was added thereto. After 1 hour, the light absorbency of the dye solution was measured. The result was that 15.5% of dye was decontaminated from the solution.

Comparative Example 8

200 Mg of granular active carbon was added into a reactor and 10 ml of Yellow 5GL dye $10^{-4}$ M solution was added thereto. After 1 hour, the light absorbency of the dye solution was measured. The result was that 67.9% of dye was decontaminated from the solution.

Comparative Example 9

200 Mg of Zeolite adsorbent for water treatment was added into a reactor and 10 ml of humic acid 250 ppm. solution was added thereto. After 1 hour, the COD of the dye solution was measured. The result was that 3% of humic acid was decontaminated from the solution.

Comparative Example 10

200 Mg of Celite adsorbent was added into a reactor and 10 ml of humic acid 250 ppm. solution was added thereto. After 1 hour, the COD of the dye solution was measured. The result was that 15% of humic acid was decontaminated from the solution.

Comparative Example 11

200 Mg of granular active carbon adsorbent was added into a reactor and 10 ml of humic acid 250 ppm. solution was added thereto. After 1 hour, the COD of the dye solution was measured. The result was that 70% of humic acid was decontaminated from the solution.

Comparative Example 12

Granular active carbon adsorbing Yellow 5GL of Comparative Example 11, was added into a reactor and 10 ml of N,N-dimethylformide was added thereto. After 1 hour, the light absorbency of the solution thus obtained, was measured. The result was that dye was scarcely eluted into the solvent.

Comparative Example 13

Granular active carbon adsorbing humic acid of Comparative Example 11, was added into a reactor and 10 ml of N,N-dimethylformamide was added thereto. After 1 hour, the light absorbency of the solution thus obtained, was measured. The result was that humic acid was scarcely eluted into the solvent.

According to the methods of the present invention, dye contained in waste water of dye industry, heavy metal ion contained in waste water, surfactant, humic substance contained in trash sediment can be decontaminated effectively and quickly by using polystyrene grafted with polyethylene glycol.

The polystyrene adsorbent of the present invention represents superior adsorption efficiency than that of traditional inorganic adsorbent. Moreover, in comparison with granular active carbon, the polystyrene adsorbent of the present invention represents same or superior adsorption efficiency, and particularly, represents excellent properties in adsorption/desorption process of humic acid and in regeneration of adsorbent, which have never been acknowledged and expected in granular active carbon adsorption method.

The more pertinent important features of the present invention have been outlined above in order that the detailed description of the invention which follows will be better understood and that the present contribution to the art can be fully appreciated. Those skilled in the art can appreciate that the conception and the specific Examples disclosed herein may be readily utilized as a basis for modifying or designing other structures for carrying out the same purposes of the present invention.

Further, those skilled in the art can realize that such equivalent constructions do not depart from the spirit and scope of the invention as set forth in the claims.

What is claimed is:

1. A polystyrene spherical resin grafted with polyethylene glycol wherein the polystyrene resin is crosslinked with 1 to 10 wt % of divinylbenzene, the content of polyethylene glycol is more than 50 wt % to 99 wt % and the molecular weight of polyethylene glycol is more than 500 to 3,000 Da and the polystyrene resin mesh size is from 100 to 500.

2. The polystyrene spherical resin grafted with polyethylene glycol of claim 1, wherein the polystyrene resin is crosslinked with 1 to 8 wt % of divinylbenzene.

3. The polystyrene spherical resin grafted with polyethylene glycol of claim 1, wherein the polystyrene resin is crosslinked with 1 to 6 wt% of divinylbenzene.

4. A process for decontamination of dye from waste water by adsorption and desorption, wherein the adsorbent comprises a polystyrene spherical resin grafted with polyethylene glycol wherein the polystyrene resin is crosslinked with 1 to 10 wt % of divinylbenzene, the content of polyethylene glycol is more than 50 wt % to 99 wt %, the molecular weight of polyethylene glycol is more than 500 Da, and the polystyrene resin grafted with polyethylene glycol is in mesh size from 100 to 500.

5. A process for removing dye which is soluble in aprotic organic solvents, which comprises adsorbing said dye from a polystyrene spherical resin grafted with polyethylene glycol of 100 to 500 mesh wherein the polystyrene resin is cross-linked with 1 to 10% by weight of divinyl benzene, the content of polyethylene glycol is more than 50 weight percent and molecular weight of polyethylene glycol is more than 500 da, the dye is desorbed by washing at least once with the aprotic solvent; and the dye is separated and removed from said solvent.

6. The process of claim 5, wherein the aprotic organic solvent is selected from the group consisting of N,N-dimethylformamide, N,N-dimethylacetamide and N-methyl-2-pyrrolidinone.

7. A process for decontamination contaminants contained in trash waste water by adsorption and desorption, wherein an adsorbent of 100 to 500 mesh comprises a polystyrene spherical resin grafted with polyethylene glycol and the polystyrene resin is crosslinked with 1 to 10% of divinylbenzene, the content of polyethylene glycol is more than 50 wt % to 99 wt % and the molecular weight of polyethylene glycol is more than 500 Da, and the waste water is treated with the resin in an organic aprotic solvent.

8. A process for recovering a polystyrene spherical resin adsorbent grafted with polyethylene glycol wherein the polystyrene resin of 100 to 500 mesh and is crosslinked with 1 to 10 wt % of divinylbenzene, the content of polyethylene glycol is more than 50 wt % to 99 wt % and the molecular weight of polyethylene glycol is more than 500 Da from waste water by using an aprotic organic solvent selected from the group consisting of N,N-dimehtylformnamide, N,N-dimethylacetamide and N-methyl-2-pyrrolidinone.

9. The polystyrene spherical resin as claimed in claim 1, wherein the resin is prepared by a process that comprises controlling the content and molecular weight of the polyethylene glycol that is grafted onto the polystyrene resin in the presence of a cross-linking agent that comprises from 1 to 10% by weight of divinyl benzene, so that the content of the polyethylene glycol is more than 50 weight percent to 99 wt % and the molecular weight of polyethylene glycol ranges from more than 500 to 3,000 Da.

10. The polystyrene spherical resin, as claimed in claim 9, wherein the polystyrene resin is cross-linked with 2 to 8% by weight of divinyl benzene.

11. The polystyrene spherical resin, as claimed in claim 9, wherein the polystyrene resin is cross-linked with 4 to 5% by weight of divinyl benzene.

* * * * *